(12) United States Patent
Chabanne

(10) Patent No.: US 8,680,968 B2
(45) Date of Patent: Mar. 25, 2014

(54) BIOMETRIC ACCESS CONTROL PROTECTION

(75) Inventor: Hervé Chabanne, Paris (FR)

(73) Assignee: Morpho, Issy-les-Moulineaux (FR)

( * ) Notice: Subject to any disclaimer, the term of this patent is extended or adjusted under 35 U.S.C. 154(b) by 1071 days.

(21) Appl. No.: 12/281,463

(22) PCT Filed: Feb. 15, 2007

(86) PCT No.: PCT/FR2007/000277
§ 371 (c)(1),
(2), (4) Date: Sep. 2, 2008

(87) PCT Pub. No.: WO2007/101922
PCT Pub. Date: Sep. 13, 2007

(65) Prior Publication Data
US 2009/0033461 A1    Feb. 5, 2009

(30) Foreign Application Priority Data
Mar. 3, 2006    (FR) ...................................... 06 01933

(51) Int. Cl.
*G05B 19/00*    (2006.01)
*G05B 23/00*    (2006.01)

(52) U.S. Cl.
USPC .......... 340/5.82; 340/5.53; 340/5.21; 340/5.1

(58) Field of Classification Search
USPC ....................................................... 340/5.82
See application file for complete search history.

(56) References Cited

U.S. PATENT DOCUMENTS

| | | | | |
|---|---|---|---|---|
| 5,506,905 A | * | 4/1996 | Markowski et al. | 380/262 |
| 5,600,324 A | * | 2/1997 | Reed et al. | 341/176 |
| 6,836,554 B1 | | 12/2004 | Bolle et al. | |
| 2004/0042642 A1 | * | 3/2004 | Bolle et al. | 382/115 |
| 2004/0049646 A1 | * | 3/2004 | Kusakabe et al. | 711/164 |

FOREIGN PATENT DOCUMENTS

| | | |
|---|---|---|
| EP | 1 302 907 | 4/2003 |
| FR | 2861482 | 4/2005 |
| WO | WO-01/99337 | 12/2001 |
| WO | WO-02/095657 | 11/2002 |

OTHER PUBLICATIONS

International Search Report for PCT/FR2007/000277, dated Jul. 5, 2007.

* cited by examiner

*Primary Examiner* — Daniel Wu
*Assistant Examiner* — Frederick Ott

(57) ABSTRACT

An access control system (10) comprises a server (12) suitable for controlling access; a biometric signal sensor (11); and an interface device (13) suitable for hooking up with the server and with the sensor, access being authorized to a person associated with a reference signal. The server and the interface device manage a common parameter that takes different values over time, and, respectively a first and a second non-invertible transformation function, these functions being parameterized as a function of the common parameter. The sensor senses a biometric signal and provides it to the interface device. At the interface device level, a transformed biometric signal is obtained by applying the first function to an element from the group comprising a characteristic emanating from the sensed signal and the sensed signal, then transmitted (14) to the server. At the server level, a comparison of the transformed biometric signal with a comparison signal is performed, said comparison signal resulting from the application of the second function to an initial signal arising from the reference signal. Finally, a decision is made on the basis of the comparison as to whether access is authorized.

15 Claims, 1 Drawing Sheet

BIOMETRIC ACCESS CONTROL PROTECTION

CROSS-REFERENCE TO RELATED APPLICATIONS

The present application is the U.S. National Phase of PCT/FR2007/000277, filed on Feb. 17, 2007, which claims the benefit of priority of French Patent Application No. 0601933, filed Mar. 3, 2006.

STATEMENT REGARDING FEDERALLY SPONSORED RESEARCH OR DEVELOPMENT

Not applicable.

THE NAMES AND PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

The present invention relates to access control, and more particularly access control based on biometric analysis, i.e. an analysis of individual physical characteristics.

In order to guarantee the security of certain information an access control of people can be implemented on the basis of a biometric analysis of people. These controls can be based on an analysis of morphological characteristics such as for example fingerprints, retina, iris or face, or also on an analysis of behavioural characteristics, such as for example characteristics related to signature dynamics, or also to keystroke dynamics. These controls can also be based on a combination of these different types of analysis.

The general aim of the implementation of such access controls is the protection of information which only a defined group of people is authorized to access. This information can be located for example on a physical site and in this case the access control consists of controlling the physical access of a person on this site. They can also be accessed via a computer system and in this case the access control consists of controlling the access to this computer system.

Whatever the type of information and the type of access to this information, a biometric control system generally comprises an access control server which manages a database storing the comparison signals corresponding respectively to the individual characteristics of the people authorized to access this information. It also comprises a plurality of access control sensors which are suitable for collecting a biometric signal for control relating to a person who wishes to access the information, and to cooperate with a transmission device so as to transmit the collected biometric signal to the control server. For example, when the biometric access control is based on the characteristic of a fingerprint, the comparison signals correspond to the digital images of fingerprints of the group of people authorized to access the information or people authorized subsequently. Thus, during access control of a person, the latter positions his finger on one of the access control sensors of the system. An image of the fingerprint of this person is then captured, then transmitted in the form of a biometric signal to the control server which is then in a position to compare the received collected biometric signal and the comparison signals stored in the database, in order to determine if the person wishing to access the information is part of the group of people authorized to do so.

A biometric signal comprises the individual characteristics which do not change, or change very little, over time. Thus, it is important to protect the confidential character of such biometric signals in such access control systems.

To this end, document U.S. Pat. No. 6,836,554 discloses a control system in which the comparison signals and the collected biometric signals to be verified are stored and manipulated in a transformed form, obtained by applying a non-invertible transformation function to the collected biometric signal. More precisely, in order that the control server learns the comparison signals with which the signals collected during an access control are compared, the sensor collects, in an initialization phase, a biometric signal of an authorized person, then this collected signal is transformed by applying a transformation function corresponding to the person who is to be verified, before being sent, thus transformed, to the control server. The latter stores it in order to be able to carry out an access control by comparing the received signal and the stored signals.

In this way, the server directly stores the comparison signals in a transformed form which corresponds to the form according to which it also receives the respective collected signals.

Thus, a potential attacker can only intercept a transformed biometric signal because the stored and exchanged signals are in a transformed form. Moreover, a potential attacker is not in a position to restore the original biometric signal from the transformed form of an intercepted biometric signal because the transformation function which has been applied has a non-invertible character.

On the other hand, if a potential attacker retrieves a comparison signal in the database or also intercepts a biometric signal to be verified during its transmission between a sensor and the control server, he is then in a position to replay this transformed intercepted biometric signal in any context in order to access the protected information.

Document U.S. Pat. No. 6,836,554 proposes, in the case where the security of such a system is compromised by an attack based in this way on replaying a transformed biometric signal, replacing the transformation function corresponding to the transformed biometric signal with a new transformation function.

However, in such a case, it is then envisaged that the server learns the new transformation signal corresponding to an authorized person, as in the initialization phase described above. This results in a complexity and slowness of such a transformation function change management because a new input of the comparison signal is then required.

The present invention aims to overcome the above-mentioned drawbacks.

SUMMARY OF THE INVENTION

A first aspect of the present invention proposes an access control method in an access control system comprising an access control server capable of controlling access, at least one biometric signal sensor; and an interface device adapted to be linked, on the one hand, to the control server and on the other, to the sensor.

Controlled access is authorized for at least one person with whom a reference signal, comprising the corresponding items of biometric information, is associated.

The control server and the interface device, on the one hand, manage a common parameter taking the different values over time, and on the other, store respectively a first and a second non-invertible transformation function, said first and second functions being parameterized as a function of at least the common parameter.

The method comprises the following steps:

/a/ at the level of the sensor, collecting a biometric signal and providing the collected biometric signal to the interface device;

/b/ at the level of the interface device, obtaining a transformed biometric signal by applying the first transformation function to an element from a group comprising at least one characteristic originating from said collected biometric signal and said collected biometric signal; and transmitting the transformed biometric signal to the control server;

/c/ at the level of the control server, carrying out a comparison of the transformed biometric signal with at least one comparison signal, the comparison signal corresponding to a signal resulting from the application of the second transformation function to an initial signal originating from the reference signal; and /d/ on the basis of the comparison, deciding if access is authorized.

By means of these provisions, given that the first transformation function applies to the collected biometric signal and the second transformation function applies to the initial signal originating from the reference signal, both are determined using a common parameter, the value of which develops as a function of time, an attack based on replaying an intercepted transformed biometric signal can advantageously be avoided. In fact, at each change in value of the common parameter, the transformation function applied can thus correspond to a transformation which is different from that which has just been applied to the previous control. This differently-parameterized transformation function is determined both on the part of the person to be verified and on the part of the control server. As a result, for a same person to be verified at different times, the biometric signals transformed or distorted in a different manner are processed according to such a control, and it is for this reason impossible to attack such a method on the basis of replaying an intercepted transformed biometric signal.

In such a context, changing a transformation to be applied to a captured image is simple to implement and does not require a new input of a biometric reference signal each time, as is the case in the prior art.

The first transformation function is suitable for application either directly to the biometric signal collected by the sensor, or to be applied to one or more biometric characteristics originating from the collected biometric signal, i.e. extracted from the collected biometric signal, for example by using an algorithm known to a person skilled in the art.

The initial signal or the initial signals obtained on the part of the server correspond either to signals collected directly or to characteristics extracted from collected biometric signals, using the element of the group under consideration to which the first transformation function is applied.

In an embodiment of the present invention it is possible to determine a development of the common parameter allowing a modification, for each access control, of the transformation to be applied to the biometric signal collected by the sensor from one person. In certain cases a slower development of the values of the common parameter can be provided. This development of the common parameter can advantageously be determined depending on the level of security aimed for in the control system under consideration.

In an embodiment of the present invention, the values of the parameter common to the control server and the interface device are a function of the values of a counter, managed at the level of the interface device and the server, of the number of transformed biometric signals which are respectively transmitted and received by the interface device and the control server.

In this context, the counters managed respectively by the server and by the sensor have approximately synchronous values and can therefore advantageously be used to determine the value of the common parameter. It can be envisaged that, regularly, after N biometric signals have been collected and transmitted by the sensor to the server, the common parameter is incremented, N being an integer which can advantageously be defined depending on the level of security sought for such an access control.

In a variant, where the access control server and the sensor are synchronized on a common time reference, the values of the common parameter are a function of this common time reference.

Thus, incrementing the common parameter can be envisaged after each time period T, this period T being defined depending on the level of security sought in the control system under consideration.

The values of the common parameter can correspond to the values entered at the level of the interface device. In this case, each new value of the common parameter, used to parameterize the transformation function, is transmitted from the interface device to the control server.

In an embodiment of the present invention, the access control system controls access to a plurality of types of applications, such as for example, physical access to a physical site, access to a computer database in a computer network, and access to a banking service also in a computer network. In such a context, a plurality of pairs, formed on the one hand by a first non-invertible transformation function at the level of the interface device and on the other by a second non-invertible transformation function at the level of the control server, are respectively associated with said plurality of types of applications. Thus, advantageously, a high level of security can be obtained without however modifying the parameterization of the transformation function at each control, because each different application can then be verified by implementing a different transformation function. As a result, if a potential attacker intercepts a transformed signal to be verified, he is not in a position to 'replay' this intercepted transformed signal in order to access a verified application from another type of system.

In this context, moreover, it can be envisaged that the plurality of pairs of non-invertible transformation functions is respectively associated with different common parameters.

The initial signal can comprise the reference signal. In this case, the application of the first and the application of the second non-invertible parameterized transformation function are equivalent.

In an embodiment of the present invention, the initial signal originating from the reference signal, corresponding to the authorized person or people, is obtained by applying an initial non-invertible transformation function to the reference signal, so that the initial signal is a pre-transformed signal. In this context, the first transformation function amounts to a combination of the second transformation function and the initial transformation function.

By proceeding in this way, the biometric reference signals relating to the people to whom access is authorized are stored in an already pre-transformed form. Such an embodiment allows the confidentiality of those biometric characteristics which cannot be modified for a given person to be protected.

In an embodiment of the present invention, an identifier is associated with the interface device and/or to the at least one person to whom access is authorized and the control server manages an association of the at least one comparison signal with said identifier of this person. In this case, the method can moreover comprise, before step /c/, the following steps:

obtaining at the level of the interface device an identifier corresponding to the collected biometric signal;

transmitting said identifier to the control server; and at the level of the control server, retrieving the comparison signal associated with said received identifier.

Thus, by means of the management by the control server of an association of a comparison signal corresponding to a person for whom access is authorized and an identifier for this person and/or the interface device, the server is in a position to retrieve in a more efficient manner the comparison signal in its database depending on the identifier which it receives from the person who is in the process of being verified in the control system.

In such an embodiment of the present invention, the control system can then be used as a system of authenticating a person. In fact, in such an implementation, the server is in a position for authenticating the person in the process of being verified on the basis of the identifier and the transformed biometric signal received.

The control system according to an embodiment of the present invention can also be used as an identification system. In this case, the initial signal obtained by the server is associated with an identifier of the person for whom the access is authorized. Thus, the server is in a position to identify a person on the basis of a transformed biometric signal. In fact, when the server decides that the transformed biometric signal received corresponds to an initial signal then it is in a position to retrieve an identifier of the corresponding person in the process of being verified and for this reason to identify this person.

Advantageously, in the case of an identification where the transformations applied to the collected images change upon each new access control by the same person, the information which travels between the user side and the server do not allow a potential attacker to detect when the same person is identified by a system according to the present invention.

A second aspect of the present invention proposes an interface device in an access control system comprising, on the one hand, moreover an access control server capable of verifying access and on the other, at least one biometric signal sensor. Access is authorized for at least one person to whom a reference signal, comprising the corresponding items of biometric information, is associated. The interface device can comprise:

a management unit capable of managing, on the one hand, a parameter, common to the control server, taking the different values over time, and on the other, a non-invertible transformation function, said function being parameterized using at least said common parameter;

a first interface unit capable of receiving a biometric signal collected by the sensor;

a transformation unit capable of transforming a collected biometric signal into a transformed biometric signal by applying the transformation function to an element from a group comprising at least one characteristic originating from said collected biometric signal and said collected biometric signal; and a second interface unit capable of cooperating with a transmission device (15) capable of transmitting a biometric signal transformed by the transformation unit to the control server.

The values of the common parameter can develop as mentioned according to the first aspect of the present invention.

In an embodiment of the present invention, the second interface unit of the interface device is capable of cooperating with a transmission device in order to transmit the transformed signal, this transmission device being able either to be included in the interface device, or also outside this interface device.

A third aspect of the present invention proposes a biometric signal sensor comprising an interface device according to the second aspect of the present invention.

This sensor can comprise the device for transmitting the transformed biometric signal to the control server.

A fourth aspect of the present invention proposes an access control server in an access control system comprising moreover at least one biometric signal sensor and an interface device capable of being linked, on the one hand, to the control server and on the other, to the sensor.

The control server can comprise:

an interface unit capable of receiving a transformed biometric signal provided by said interface device;

a management unit capable of managing, on the one hand, a parameter, common to the interface device, taking the different values over time, and on the other, a non-invertible transformation function, said transformation function being parameterized using at least said parameter common to said initial signal;

a transformation unit capable of transforming at least one initial signal originating from the at least one reference signal into at least one comparison signal by applying the transformation function;

a comparison unit capable of carrying out a comparison of the received transformed biometric signal with the at least one comparison signal; and a decision unit capable of deciding if access is authorized on the basis of the comparison carried out by the comparison unit.

A fifth aspect of the present invention proposes an access control system comprising:

a biometric signal sensor according to the third aspect of the present invention;

an interface device according to the second aspect of the present invention; and an access control server according to the fourth aspect of the present invention.

Other aspects, aims and advantages of the invention will become apparent upon reading the description of one of its embodiments.

BRIEF DESCRIPTION OF THE DRAWINGS

The invention will also be better understood with the help of the drawings, in which.

DETAILED DESCRIPTION OF THE INVENTION

Figure 1:
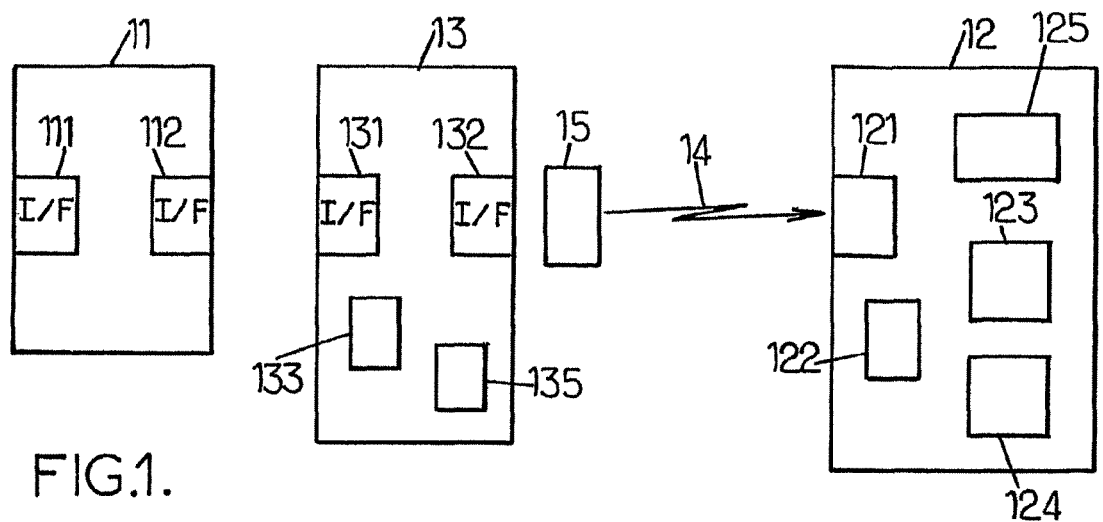
FIG. 1 illustrates an architecture of different entities comprised in an access control system according to an embodiment of the present invention.

In the following sections, by the term 'biometric signal' is meant a signal originating from a biometric sensor applied to a person.

Such a biometric signal can correspond to a captured image of a fingerprint of the person under consideration, or also to a captured image of an iris, or an image of the face or of the part of the face of this person.

By the term 'reference signal' is meant a biometric signal of a person for whom verified access according to an embodiment of the present invention is authorized. A reference signal is provided by a biometric sensor, as long as a transformation function within the meaning of the present invention is not applied.

By the term 'initial signal originating from a reference signal' is meant either the reference signal directly, or also the reference signal pre-transformed by applying an initial transformation.

An initial signal is a signal which is available to the server. It can for example be stored in a database managed by the server or also be provided to the server by any means of transmission.

In the following sections, the common parameter is approximately synchronized at the level of the interface device and the control server so that the same parameter is used at the moment where a collected biometric signal is transformed at the level of the interface device and at the moment where the signal transformed in this way is received and processed at the level of the control server.

A non-invertible transformation function within the meaning of the present invention can be any non-invertible function which allows an image to be transformed or also distorted into a distorted image. In particular one of the transformation functions described in document U.S. Pat. No. 6,836,554 can be used.

In the case where the sensor captures an image of a fingerprint, the transformation function can be a function, the application of which consists of a distortion of the image in the spatial domain. The image can thus be broken down to be transformed into a plurality of parts, then said parts of images thus obtained distributed into a specified different spatial distribution.

Here, the common parameter can, for example, serve to specify a new distribution of the parts of the original image. It can also consist of defining new forms of the different parts of the image to be distributed according to the specified distribution. It can also be envisaged that a combination of the two common parameters mentioned above be taken into account.

In the case where the sensor captures an image of the face or of one part of the face, the transformation function can also be a function which distorts the captured image in the spatial domain. The image can, here also, be broken down into a plurality of parts. Then, certain contours of these parts obtained in this way can be modified, thus implying a different distortion of the different parts for which the contours have been modified.

Here, the common parameter can, for example, correspond to the number of parts making up the image to be transformed. It can also correspond to the modification imposed on certain at least of the contours of certain parts of the image to be transformed.

In the case where the sensor captures an image of the iris, the transformation function can also be a distortion function of the captured image in the spatial domain. A view of the iris can for example be broken down into a plurality of angular sectors. Then, application of the transformation function can consist of modifying certain at least of the angles of these angular sectors obtained in this way by reducing certain angles and by increasing certain others.

Here, the common parameter can be used to determine a change in the reduction and/or in the increase of certain angles.

Parameterization of such a transformation function by a plurality of common parameters, as defined in the present description, can be envisaged.

FIG. 1 illustrates an architecture of different entities comprised in an access control system according to an embodiment of the present invention.

In the following sections, by way of example only, the present invention is described in its application to a physical access control of people on a given physical site, by a biometric control based on the biometric characteristics of a fingerprint. In such a context, a biometric signal sensor according to an embodiment of the present invention is placed for example at an access door to a building, the entrance of which is controlled according to an embodiment of the present invention. Thus, in the case where the access is authorized, this door can be opened.

Such an access control system comprises an access control server 12 which can have comparison signals available which are intended to be compared to a transformed received signal to be verified. It comprises moreover a biometric signal sensor 11 and an interface device 13.

In such an access control system, the biometric signal sensor 11 comprises a first interface unit 111 capable of capturing an image of a fingerprint of a person wishing to access the building protected according to an embodiment of the present invention. It comprises moreover a second interface unit 112 capable of providing a biometric signal collected in this way to the interface device 13.

The interface device 13 comprises a management unit 133 capable of managing, on the one hand, a parameter, common to the control server, taking the different values over time, and on the other, a non-invertible transformation function, this function being parameterized using at least said common parameter. It also comprises a first interface unit 131 capable of receiving a biometric signal collected by the sensor; It also comprises a transformation unit 135 capable of transforming the collected biometric signal received by the first interface unit into a transformed biometric signal. It comprises moreover a second interface unit 132 capable of allowing the transmission of the transformed biometric signal by the transformation unit to the control server 12.

It can be envisaged that the second interface unit cooperates with a transmission device 15 capable of effectively transmitting the transformed biometric signal to the control server. This transmission device 15 can be located in the sensor or in the interface device, or also separate from the sensor 11 and from the interface device 13.

A control server 12 according to an embodiment of the present invention can comprise a management unit 123 capable of managing, on the one hand, a parameter, common to the interface device 13, taking the different values over time, and on the other, a second non-invertible transformation function, this function being parameterized using at least the common parameter.

It also comprises a transformation unit 122 capable of transforming the signals originating from the reference signals into respective comparison signals by applying the second transformation function.

This server 12 comprises moreover an interface unit 121 capable of receiving a transformed biometric signal provided by the interface device 13. It also comprises a comparison unit 124 capable of comparing the received transformed biometric signal with the comparison signals, as well as a decision unit 125 capable of deciding if access is authorized on the basis of the comparison carried out by the comparison unit 124.

In an embodiment of the present invention, the sensor 11 and the interface device 13 are different entities such that, advantageously, the interface device is detachable and mobile independently of the biometric signal sensor 11. Thus, it can be envisaged that each person wishing to enter the building has such an interface device 13.

In a variant, the interface device 13 can be included in the sensor 11 such that the two entities only form one. In this case it can be envisaged that the sensor, and for this reason the interface device, is fixed at the level of the entrance door to the building where access is protected.

In the latter case, the sensor may be able receive the common parameter from the person in the process of being verified via any input interface. Then, this parameter is used at the level of the interface device so as to parameterize the first transformation function. Subsequently, this parameter is then sent to the server so that it can also parameterize its second transformation function. Thus, the common parameter is first entered by the person wishing to access the building, then it is sent to the control server. By proceeding in this way, the respective transformation functions can be correctly parameterized so as, on the one hand, to provide a collected biometric signal transformed by the first transformation function parameterized by the common parameter at the level of the sensor and on the other hand, to obtain comparison signals corresponding to the reference signals transformed by applying a transformation function equivalent to the first transformation function.

It can be envisaged that the control server 12 has reference signals available directly. In this case, the application of the first transformation function can directly be equivalent to the application of the second transformation function.

In a variant, the control server can have available initial signals which originate from the reference signals, these initial signals corresponding to the reference signals pre-transformed by applying an initial transformation function. In this case, it can be envisaged that the application of the first transformation function is equivalent to the combined application of the second transformation function and the initial transformation function.

These initial signals can be made available to the server 12, for example, by a database in which they are stored and to which the server has access, or also by any other means.

In an embodiment of the present invention, a person therefore has an interface device 13, which he connects to a biometric signal sensor 11 situated near the door which the person wishes to pass through. Then, he places for example his index finger on the sensor 11. The sensor 11 captures an image of the fingerprint of the index finger of this person. Then, this sensor 11 provides this biometric image to the connected interface device 13 in the form of a biometric signal. This biometric signal is received at the level of the first interface unit 131 of the interface device 13.

It is subsequently provided to the transformation unit 135. The latter transforms this collected biometric signal by applying the first transformation function, parameterized with the value of the common parameter provided by the management unit 133. The value of this common parameter develops over time in an approximately synchronized manner at the level of the management unit 133 of the interface device 13 and at the level of the management unit 123 of the control server 12.

Thus, a transformed biometric signal is obtained which is transmitted at the level of the second interface unit 132. This interface unit is capable of cooperating with a transmission device 15 which can be either co-localized with this second interface unit or a separate entity of the interface device.

Then, this transformed biometric signal 14 is transmitted to the control server 12. In order to process this transformed biometric signal, the control server 12 obtains reference signals transformed according to a transformation function similar to that which has been applied at the level of the interface device 13.

To this end, it can be envisaged that the server stores, or at least has access to, the reference signals of authorized people, and that it has the same transformation function available as that managed by the management unit of the interface device 13. In this case, it applies this transformation function parameterized by the common parameter to the reference signals. The result is comparison signals corresponding to the reference signals transformed in the same way as the collected biometric signal to be verified has been transformed on the user side.

Thus, the server compares the received transformed signal and the comparison signals described above and deduces whether or not the person in the process of being verified is one of those people who are authorized. This comparison, which aims to compare two images which have potentially been captured in a different manner, then transformed, is not a strict comparison.

In another variant, the control server 12 only has reference signals in a pre-transformed form, corresponding to the application of an initial transformation function on the non-invertible reference signals. Thus, the protection is increased because, even if an attacker can retrieve one of the signals which the control server has, he does not have access to the original reference signal.

In this variant, the management unit 123 of the control server manages a second transformation function which differs from the first function of the interface device 13. In fact, more precisely, the first transformation function is equivalent to a combination of the second transformation function and of the initial transformation function. However, the first and the second transformation function are also parameterized here in the same way by the common parameter.

In an embodiment of the present invention, the access control system is moreover based on an identifier of the person to be verified. Such a variant allows the signal processing performance to be improved at the level of the control server 12.

In fact, in this case, the control server manages an association of the comparison signals with the respective identifiers of the authorized people in the control system. Then, the person in the process of being verified provides his identifier to the server using the interface device for example, or also by any other interface provided to the person at the level of the control entry door. Thus, under such conditions, the control server is in a position to retrieve the comparison signal associated with the received identifier, without having to compare the received transformed collected biometric signal with a plurality of comparison signals.

Figure 2:
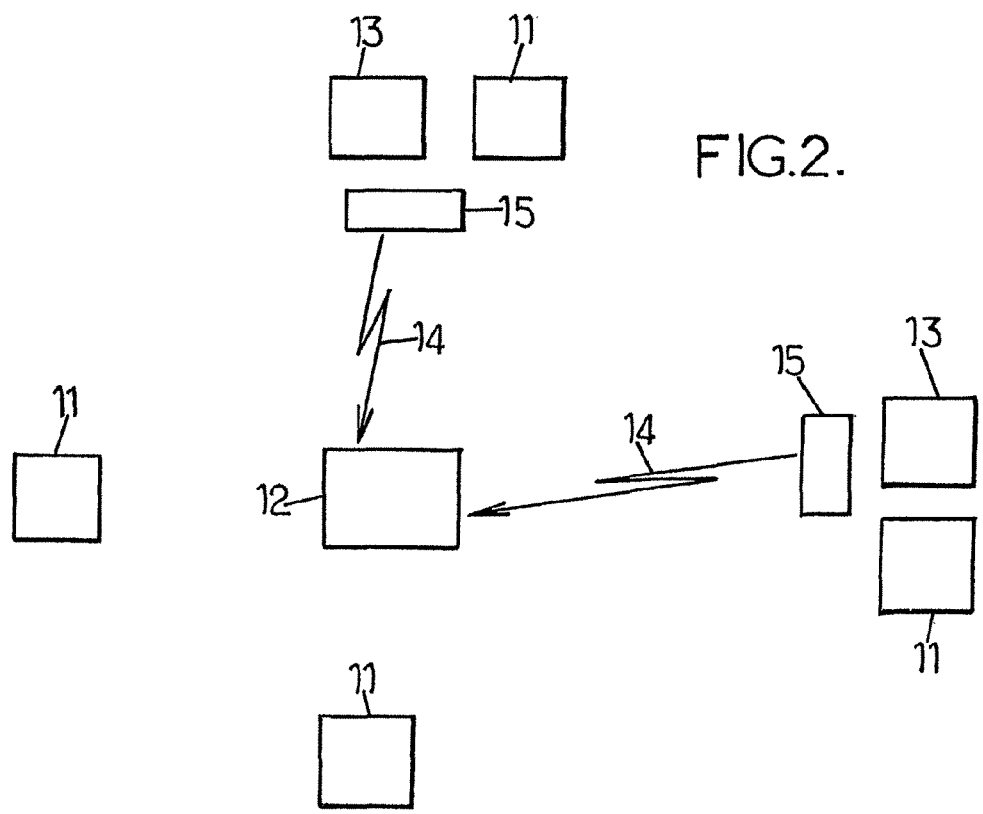
FIG. 2 illustrates a network of sensors in an access control system according to an embodiment of the present invention.

FIG. 2 illustrates a network of sensors in an access control system according to an embodiment of the present invention. Thus, in this context, each of the system's sensors can be positioned at different entry doors of a physical site or also, among these sensors, some can be co-localized with computer stations in order to carry out control of access to computer data for example.

Two of them are in the process of carrying out an access control and the interface devices 13 are connected to them.

It can be envisaged that different non-invertible transformation functions are used depending on the verified applications.

In a control system according to an embodiment of the present invention, using the common parameter, it is possible to modify the transformation of the biometric signals handled during successive access controls for one person, so as to improve the reliability of the controls. In fact, depending on the level of reliability sought, a quicker or slower development of the common parameter can be defined.

Advantageously, a variation of the common parameter can equally easily be defined at each of the controls executed for a same person so as to guarantee complete protection against attacks based on replaying an intercepted transformed biometric signal.

The invention claimed is:

1. Access control method in an access control system comprising:
   an access control server capable of controlling access;
   at least one biometric signal sensor; and
   an interface device adapted to be linked to the control server and to the sensor;
   said access being authorized for at least one person with whom a reference signal, comprising corresponding biometric information, is associated;
   the control server and the interface device managing a common parameter taking different values over time managing a first and a second non-invertible transformation function, said first and second transformation functions being parameterized using at least said common parameter;
   said method comprising the following steps:
   /a/ at the level of the sensor, collecting a biometric signal and providing said collected biometric signal to the interface device;
   /b/ at the level of the interface device, obtaining a transformed biometric signal by applying the first transformation function to an element from a group comprising at least one characteristic originating from said collected biometric signal and said collected biometric signal; and transmitting said transformed biometric signal to the control server;
   /c/ at the level of the control server, carrying out a comparison of the transformed biometric signal with at least one comparison signal, said comparison signal corresponding to a signal resulting from the application of the second transformation function to an initial signal originating from the reference signal; and
   /d/ on the basis of said comparison, deciding if access is authorized.

2. Access control method according to claim 1, in which the values of the common parameter are a function of the values of a counter, managed at the level of the interface device and the server, of the number of transformed biometric signals which are respectively transmitted and received by the interface device and the server.

3. Access control method according to claim 1, in which the access control server and the interface device being synchronized on a common time reference, the values of the common parameter are a function of the value common time reference.

4. Access control method according to claim 1, in which the values of the common parameter are entered at the level of the interface device, and in which each new value of the common parameter is transmitted to the control server.

5. Access control method according to claim 1, in which the access control system controls access to a plurality of types of applications, and in which a plurality of pairs of a first non-invertible transformation function at the level of the interface device and of a second non-invertible transformation function at the level of the control server are respectively associated with said plurality of types of applications.

6. Access control method according to claim 1, in which the initial signal comprises the reference signal and in which the application of the first and the application of the second configured non-invertible transformation function are equivalent.

7. Access control method according to claim 1, in which the initial signal originating from the reference signal, corresponding to the at least one authorized person, is obtained by applying an initial non-invertible transformation function to the reference signal; and in which the first transformation function is equivalent to a combination of the second transformation function and said initial transformation function.

8. Access control method according to claim 1, in which an identifier is associated with the interface device and/or with the at least one person to whom access is authorized and in which the control server manages an association of the at least one comparison signal with said identifier;
   said method further comprising, before step /c/, the following steps:
   obtaining at the level of the interface device an identifier corresponding to the collected biometric signal;
   transmitting said identifier to the control server; and
   at the level of the control server, retrieving the comparison signal associated with said received identifier.

9. Interface device in an access control system comprising an access control server controlling access and at least one biometric signal sensor;
   said access being authorized for at least one person with whom a reference signal, comprising the corresponding items of biometric information, is associated;
   said interface device comprising:
   a management unit managing a parameter, common to the control server, taking the different values over time, and of managing a non-invertible transformation function, said transformation function being parameterized using at least said common parameter;
   a first interface unit receiving a biometric signal collected by the sensor;
   a transformation unit transforming a collected biometric signal into a transformed biometric signal by applying the transformation function to an element from a group comprising at least one characteristic originating from said collected biometric signal and said collected biometric signal; and
   a second interface unit cooperating with a transmission device transmitting a biometric signal transformed by the transformation unit to the control server.

10. Interface device according to claim 9, in which the values of the common parameter are a function of the values of a counter, managed by the management unit, of the number of transformed biometric signals which are respectively transmitted to the server.

11. Interface device according to claim 9, in which the access control server and the interface device being synchronized on a common time reference, the values of the common parameter are a function of the value of the common time reference.

12. Interface device according to claim 9, in which the values of the common parameter are entered at the level of the interface device, and in which each new value of the common parameter is transmitted to the control server.

13. Biometric signal sensor comprising an interface device according to claim 9.

14. Access control server in an access control system comprising moreover at least one biometric signal sensor; and an interface device capable of being linked to the control server and to the sensor;

said access being authorized for at least one person with whom a reference signal, comprising the corresponding items of biometric information, is associated;

said control server comprising:
- an interface unit receiving a transformed biometric signal provided by said interface device;
- a management unit managing a parameter, common to the interface device, taking different values over time, and capable of managing a non-invertible transformation function, said transformation function being parameterized using at least said common parameter;
- a transformation unit transforming at least one initial signal originating from the at least one reference signal into at least one comparison signal by applying the transformation function to said initial signal;
- a comparison unit carrying out a comparison of the received transformed biometric signal with the at least one comparison signal; and
- a decision unit deciding if access is authorized on the basis of the comparison carried out by the comparison unit.

15. Access control server according to claim 14, further comprising:
- a biometric signal sensor, the biometric signal sensor comprising an interface device, the interface device including an access control server capable of controlling access and at least one biometric signal sensor;

said access being authorized for at least one person with whom a reference signal, comprising the corresponding items of biometric information, is associated said interface device further comprising:
- a management unit managing a parameter, common to the control server, taking the different values over time, and further managing a non-invertible transformation function, said transformation function being parameterized using at least said common parameter;
- a first interface unit receiving a biometric signal collected by the sensor;
- a transformation unit transforming a collected biometric signal into a transformed biometric signal by applying the transformation function to an element from a group comprising at least one characteristic originating from said collected biometric signal and said collected biometric signal; and
- a second interface unit cooperating with a transmission device transmitting a biometric signal transformed by the transformation unit to the control server.

\* \* \* \* \*

UNITED STATES PATENT AND TRADEMARK OFFICE
CERTIFICATE OF CORRECTION

PATENT NO. : 8,680,968 B2
APPLICATION NO. : 12/281463
DATED : March 25, 2014
INVENTOR(S) : Hervé Chabanne Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1208 days.

Signed and Sealed this
Twenty-ninth Day of September, 2015

Michelle K. Lee
*Director of the United States Patent and Trademark Office*